United States Patent [19]
Wilson et al.

[11] Patent Number: 6,144,489
[45] Date of Patent: Nov. 7, 2000

[54] CONFOCAL MICROSCOPE

[75] Inventors: Tony Wilson; Mark Andrew Aquilla Neil; Rimvydas Juskaitis, all of Oxford, United Kingdom

[73] Assignee: Isis Innovation Limited, Oxford, United Kingdom

[21] Appl. No.: 09/125,625

[22] PCT Filed: Feb. 21, 1997

[86] PCT No.: PCT/GB97/00490

§ 371 Date: Aug. 21, 1998

§ 102(e) Date: Aug. 21, 1998

[87] PCT Pub. No.: WO97/31282

PCT Pub. Date: Aug. 28, 1997

[30] Foreign Application Priority Data

Feb. 22, 1996 [GB] United Kingdom ............ 9603788

[51] Int. Cl.[7] ............ G02B 21/06; G02B 21/00
[52] U.S. Cl. ............ 359/385; 359/368; 359/371; 359/386
[58] Field of Search ............ 359/368, 385–390, 359/227, 232, 233–236, 370–371

[56] References Cited

U.S. PATENT DOCUMENTS

| | | | |
|---|---|---|---|
| 4,806,004 | 2/1989 | Wayland | 359/389 |
| 5,235,457 | 8/1993 | Lichtman et al. | 359/368 |
| 5,386,317 | 1/1995 | Corle et al. | 359/368 |

Primary Examiner—Thong Nguyen
Attorney, Agent, or Firm—Wenderoth, Lind & Ponack, L.L.P.

[57] ABSTRACT

A confocal microscope comprises a light source, a focusing arrangement, a detector and an encoded mask (17). The light source illuminates the mast (17) and the encoded light is then focused on a specimen. Light from the specimen is then decoded, by either the same or a separate complementary mask, before being detected, for example by a camera. The mask (17) is encoded with a pattern which generates a combined confocal and non-confocal image and the confocal image is subsequently extracted from the combined image. This means that confocal images of different regions of the specimen can be produced simultaneously, which in turn enables real-time confocal imaging of the specimen. In addition, as the microscope is no longer restricted to delta correlated images, an improvement in the light budget can also be achieved.

20 Claims, 3 Drawing Sheets

CONFOCAL MICROSCOPE

BACKGROUND OF THE INVENTION

The present invention relates to a confocal microscope and in particular a confocal microscope which enables real-time imaging to be performed.

In approximately the past fifteen years confocal microscopes have been developed and have been shown to provide advantages over alternative microscopy systems such as greater spatial resolution and depth discrimination. A schematic diagram of a known reflection confocal scanning microscope such as that described in *Confocal Microscopy* by Tony Wilson, Academic Press (1990) is shown in FIG. 1. The microscope consists of a laser light source 1 from which laser light passes to a lens 2 for generating a diffraction limited spot of light. The spot of light is reflected from an object 3 which is being scanned and the reflected light is extracted by a half silvered mirror 4 and then passed to a photodetector 5. The reflected light intensity is separately measured by the photodetector 5 for each scanned point on the object 3. The signals generated by the photodetector 5 are then used to intensity modulate a TV screen 6 which is scanned in synchronism with the scanning spot of light. Known confocal microscope systems such as the one described above have the disadvantage that very bright light sources are required and this usually necessitates the use of lasers. Also, as the microscope images by scanning a spot of light over the object, real-time imaging could not easily be performed.

The optical sectioning and lateral resolution achieved with the confocal microscope described above arises as a result of the illumination and imaging systems being arranged whereby only light which has originated from a specific position in the source plane is detected at the equivalent position in the detector plane. In mathematical terms this is described as the source and detector distributions being delta correlated and with most known confocal microscopes is achieved by employing a single point source and point detector.

In an alternative known confocal system which uses multiple point sources and detectors, an extended light source is used together with a spinning disc containing an array of pinholes usually arranged as interleaving Archimedian spirals. In order to prevent cross-talk between neighbouring pinholes, the pinholes are spaced far apart which results in an extremely low light budget. In general, known confocal systems have the disadvantage that the systems are designed for exact delta correlation between the source and detector distributions which inherently limits the light budget possible with the systems.

SUMMARY OF THE INVENTION

The present invention seeks to overcome the disadvantages described above with respect to known confocal microscopes whilst retaining the advantages of optical sectioning and lateral resolution and seeks to provide a confocal microscope capable of performing real-time imaging with a significantly improved light budget.

The present invention provides a confocal microscope having means for directing light to a specimen to be imaged; at least one mask for encoding light incident on the specimen and for decoding light from a plurality of regions of the specimen simultaneously thereby generating a confocal image of the specimen superimposed on a non-confocal image; and means for detecting decoded light from the specimen. Ideally, means for separating the confocal image from the detected light is additionally provided.

Thus, with the present invention the requirement that the source and detector masks are substantially delta correlated no longer applies, and hence masks with greater light efficiency may be employed in comparison with known confocal systems. Also, as the confocal image is formed simultaneously with a plurality of regions, preferably all, of the confocal image, real-time confocal imaging of a specimen can be performed.

Preferably, in order to maximize the available light budget, the non-confocal image is substantially a conventional image. The non confocal image though may include de-focused images and other imaging artefacts.

Preferably, the confocal microscope is a reflection mode microscope and a single mask is provided both for encoding light incident on the specimen to be imaged and for decoding light from the specimen. Alternatively, the confocal microscope may be a transmission mode microscope whereby two separate matched masks are provided.

In a first embodiment the mask is in the form of at least one spatial light modulator programmed to code and decode the incident and emergent light. The spatial light modulator may be arranged to produce predetermined intensity modulation or polarization modulation of incident light. In an alternative embodiment the mask is in the form of at least one rotating disk having a plurality of predetermined portions capable of varying at least one characteristic of incident light to different extents. The predetermined portions may be capable of varying the intensity, phase or polarization of incident light or any combination thereof.

The means for detecting the light from the specimen and for separating out the confocal image may be in the form of an array of photodetectors connected to a programmed computer. In an alternative, where the polarization of the incident light is encoded, the confocal image may be extracted with a polarizing beam splitter in combination with one or more photodetector arrays or other camera device.

Preferably, the mask encodes the light incident on the specimen using finite length binary time sequences. The combined confocal and conventional image may then be obtained by time averaging the detected image over the finite length of the sequence.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
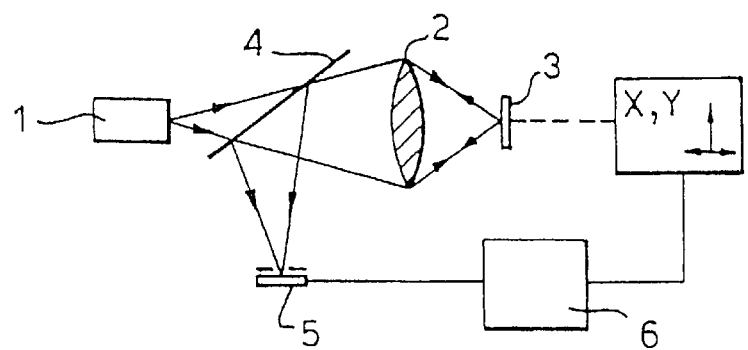
FIG. 1 is a schematic diagram of a known confocal microscope.
Figure 2:
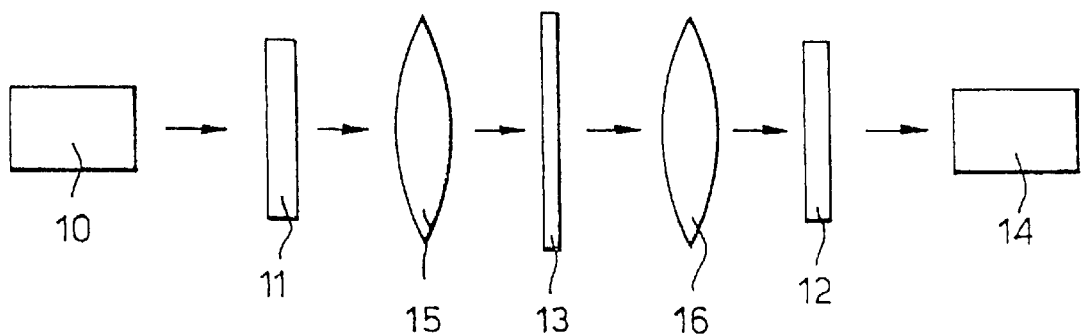
FIG. 2 is a schematic diagram of a first confocal microscope in accordance with the present invention in transmission mode.
Figure 3:
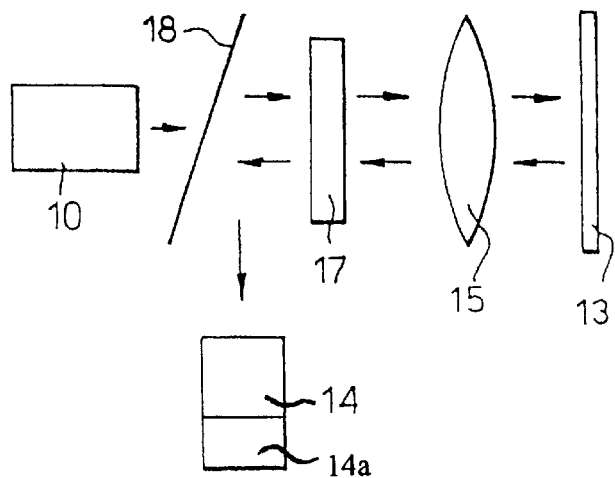
FIG. 3 is a schematic diagram of a second confocal microscope in accordance with the present invention in reflection mode.

The confocal microscope shown in FIG. 2 consists of a light source 10, a first mask 11 and a second mask 12 either side of the, specimen to be imaged 13 and a CCD camera 14 beyond the second mask 12. The light first 10 illuminates the source mask 11 which is then imaged onto the specimen by lens system 15 located between the first mask 11 and the specimen 13. Lens system 16 located between the specimen 13 and the second mask 12 images the specimen onto the second mask 12. The camera 14 images the detector mask 12. Where the confocal microscope is in reflection mode, as shown in FIG. 3, the first and second masks 11,12 are replaced by a single aperture mask 17 and a beam splitter 18 positioned between the light source 10 and the aperture mask 17 is provided for directing the reflected light to the camera ,14. FIG. 3 further illustrates a time averaging device 14a for averaging the detected light over the finite lenght of binary time sequences.

With reference to the aperture mask 17 of FIG. 3, the mask is encoded with a predetermined pattern so that each detector pixel acts as a matched filter to its corresponding source pixel. In this way the desired correlation between the source and detector distributions may be achieved. This in turn permits parallel processing of the whole image provided suitable source pixel encoding and detector pixel decoding techniques are employed. For example each source pixel may be modulated with a unique time sequence and the same sequence used as a reference signal for matched filtering at the detector. Ideally the sequence presented to each pixel should have zero cross-correlation with that presented to any other pixel and an approximation to this is the use of independent random binary sequences for each pixel. Sets of finite length sequences which possess zero cross-correlation exist such as time-shifted complementary Golay sequences but the number of sequences in the set is limited to the sequence length. As the likelihood of cross talk between distant pixels is low in practice, rather than using a sequence length equal to the number of pixels in the aperture mask a shorter sequence length may be used provided that the requirement for zero cross-correlation is satisfied for neighbouring pixels. If intensity modulation is used a dc shift must be introduced to the sequences employed as the sequences include negative numbers which cannot be reproduced optically. The result of this dc shift is that the image generated by the detector of the confocal microscope is a composite of a conventional image and a confocal image. Post processing of the image enables the confocal image to be separated out electronically in real-time. Where the image is being viewed directly by the eye, however, the composite image may be viewed when the sequences are presented faster than the eye is capable of responding.

One example of the type of aperture mask which may be used is a spatial light modulator (SLM). An SLM consists of an array of pixels in which each pixel is individually addressable. One of the advantages of using the SLM is the fast frame rate which enables real-time imaging. One particular implementation of an SLM consists of a ferroelectric liquid crystal device (FLCSLM) in which each pixel of the SLM acts as a birefringent retardation plate which can be switched in the plane of the SLM between two orientations of its optical axes.

With the FLCSLM located between crossed polarizing filters aligned along the corresponding optical axes of one of the stable states of the FLCSLM, the FLCSLM can be used as an intensity modulator. With this arrangement each individually addressable pixel of the FLCSLM transmits light in one of the states of the FLCSLM and is opaque to light in the other state of the FLCSLM and in this way the FLCSLM acts as a programmable spatial intensity modulator. This though has the disadvantage that light is lost due to attenuation in the opaque pixels.

In an alternative arrangement of the FLCSLM in which the crossed polarizing filters are replaced by a polarizing beam splitter and a quarter-wave plate, the light incident on the FLCSLM is arranged to be linearly polarized along the bisector of the principal axes of the two FLCSLM states whereby the FLCSLM functions as a polarization modulator. This results in light which passes through the same pixel both to and from the specimen experiencing a change in its polarization whereas light which, on reflection from the specimen, passes through a pixel in a different state to the state of the pixel through which it passed to the specimen experiences no change in its polarization. This in turn results in the polarizing beam splitter rejecting light which passes through different pixels on the way to and from the specimen. The camera positioned behind the polarization beam splitter will therefore only register light which passed through the same pixel to and from the specimen. The camera will also register light which passed through a different pixel from the specimen which is in the same state as the pixel through which it passed to the specimen. This will result in a conventional image being superimposed on the confocal image. The conventional image, as mentioned earlier, may be subtracted electronically from the combined image to form a pure confocal image of the specimen. If, however, an image is formed using the light rejected by the polarizing beam splitter then the contrast of the confocal part of the image is reversed. It is therefore possible to obtain the confocal image in real-time merely by subtracting the images obtained at both outputs of the polarizing beam splitter. The polarization approach has the advantage that less light is lost than in the arrangement where the FLCSLM is arranged as an intensity modulator.

An alternative implementation of an SLM is a digital micromirror device (DMD) which consists of a large array of very small mirrors, each of which can be individually addressed to control deflection of an incident light beam. The DMD is particularly suited to use as an SLM in reflection mode with the orientation of the individual mirrors being encoded in a manner similar to that described above with respect to the FLCSLM.

Figure 4:
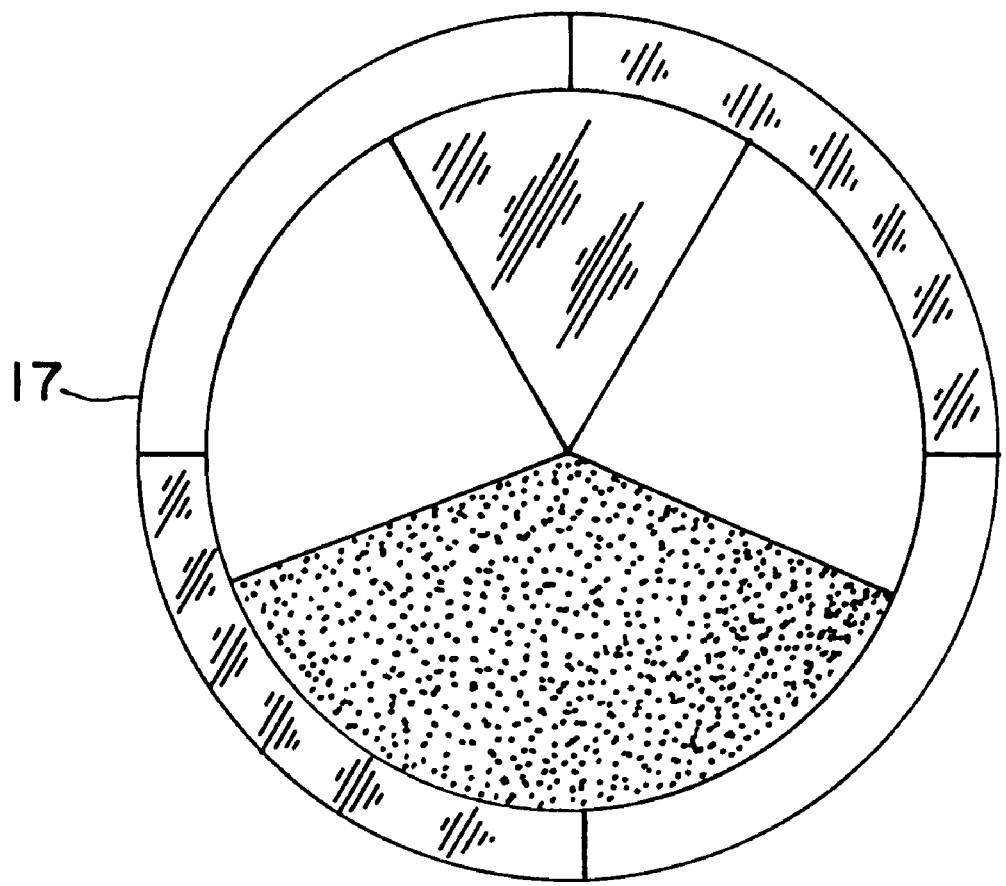
FIG. 4 is a diagram of one embodiment of an aperture mask used with confocal microscopes in accordance with the present invention.

Instead of an SLM the aperture mask may be in the form of a spinning disc. The spinning disc may be impressed with the sequences or modulation codes photolithographically and an example of a suitable mask for use in the confocal microscope is shown in FIG. 4. As it is necessary for the conventional image to be subtracted from the confocal image, blank sectors are provided on the disk to provide the conventional image. The camera and the electronics are then synchronized with the disc rotation to enable the subtraction to be performed. Although the spinning disk shown in FIG. 4 uses intensity modulation for the encoding in a further alternative the spinning disk may be arranged to perform polarization modulation.

If the disc does not include the blank sectors described above, the image produced is a combined confocal and conventional image with the confocal image appearing as a bright region superimposed on the ordinary image. The absence of the blank sectors means that the conventional image cannot be selectively extracted through appropriate synchronization as in the previous example. This image is particularly useful for navigating around a specimen to identify a specific region of interest. In this case, the image is used in its combined form without extraction of the confocal image.

Instead of the pattern of modulation codes shown in FIG. 4, the disc may be encoded with a regular, close packed pattern for example in the form of a checker-board or uniform lines of equal spacing. In this case, if the disc is then illuminated with incoherent light a combined non-confocal and confocal image is obtained from which the confocal image can be extracted in the manner described. Alternatively coherent illumination may be employed when fluorescent imaging is being performed.

Instead of a straightforward subtraction of the two images, the confocal image can be recalled using an alternative procedure in which the image from a single camera consists of the conventional image $I_o$ on even lines and the combined conventional and confocal image $I_o+I_c$ on odd lines. The image can be described as follows in which S has a value of +1 for odd lines and −1 for even lines:

$$I=I_o+I_c(1+S)/2$$

Multiplying image I by S gives $$IS=I_c/2+I_cS/2+I_oS$$

This image contains a mixture of the confocal image and the confocal image combined with the conventional image imposed on a carrier S. Since the carrier S consists of positive and negative high spatial frequency components to which the frequency components in the conventional image are shifted, the confocal image may be easily extracted by low pass filtering of the image IS. In practice this is performed by the use of fast Fourier transforms. In addition, once the confocal image has been extracted it is also possible for the conventional image to be extracted. In this way both confocal and conventional images may be generated simultaneously.

It will be apparent that in addition to the above described implementations of the aperture mask, further alternatives of encoding of the aperture mask are envisaged. For example wavelength encoding or frequency modulation and demodulation of individual pixels or random time varying encoding of pixels with decoding by matched filtering through the same mask may alternatively be employed. Also, although reference has been made to a CCD camera it will be understood that alternative cameras may be used with the confocal microscope described.

Although reference has been made primarily to the confocal microscope in reflection mode and thus to an aperture mask, the extension of this arrangement to the transmission mode is straightforward with the aperture mask being replaced with matched source and detector masks.

With the confocal microscopes described above the image quality and the light budget are independent of one another. The image quality is dependent on the sophistication and length of the code sequences and the light budget is determined on the basis of the modulation employed. The confocal microscope enables real-time imaging to be performed and this includes all three-dimensional modes of operation. Direct viewing of the composite image can be performed and as shown in FIG. 5 conventional microscopes may be easily converted to generate confocal images as desired.

Figure 5:
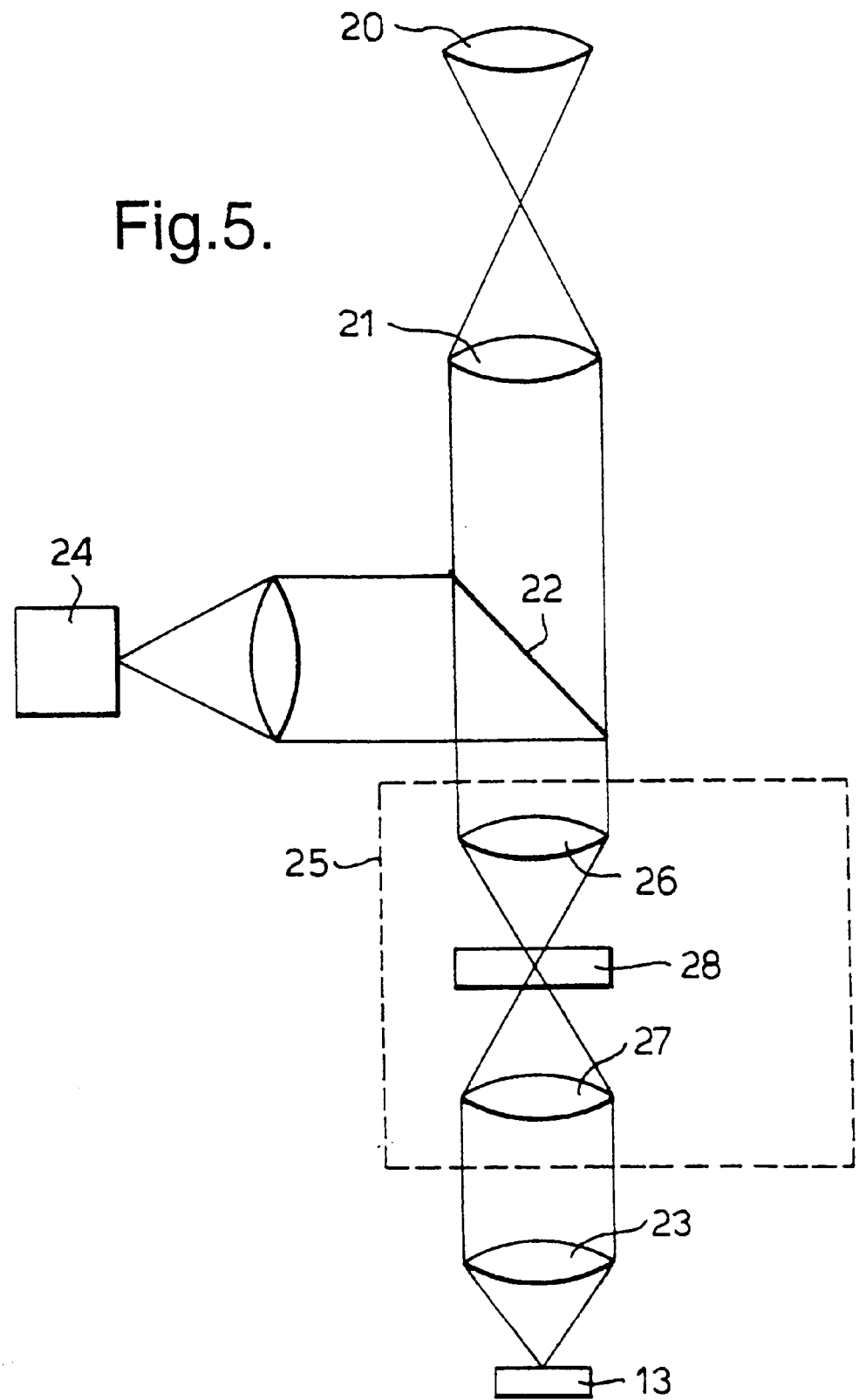
FIG. 5 is a diagram of a conventional microscope with a confocal system in accordance with the present invention.

In FIG. 5 a conventional microscope is shown comprising an eye piece 20, a tube lens 21, a beam splitter 22, an objective lens 23 and a light source 24. The microscope usually operates in reflective mode with the specimen 13 located beyond the objective lens 23. In order to adapt the microscope to function as a confocal microscope, a confocal attachment 25 is provided between the beam splitter 22 and the objective lens 23. The confocal attachment 25 includes two lens systems 26,27 which are positioned one either side of an aperture mask 28 which is encoded in the same manner as described above so that a combined confocal and conventional image is obtained.

Further advantages include the use of the confocal microscope in fluorescent imaging without a laser light source and endoscopy using a fibre imaging bundle.

What is claimed is:

1. A confocal microscope comprising means for directing light to a specimen; at least one composite image mask for encoding light incident on a plurality of regions of the specimen and for simultaneously decoding light from the plurality of regions of the specimen whereby the decoded light produces a confocal image superimposed on a non-confocal image; means for detecting decoded light from the specimen; and extraction means for separating the confocal image of the specimen from the detected light.

2. A confocal microscope as claimed in claim 1, wherein the at least one composite image mask decodes light from the specimen to produce a composite image that is a confocal image superimposed on a conventional image.

3. A confocal microscope as claimed in claim 2, wherein the at least one composite image mask is adapted to encode and decode light using finite length binary time sequences.

4. A confocal microscope as claimed in claim 3, wherein the extraction means comprises a time averaging device for averaging the detected light over the finite length of the sequences.

5. A confocal microscope as claimed in claim 2, wherein the at least one composite image mask is a spatial light modulator.

6. A confocal microscope as claimed in claim 1, wherein the at least one composite image mask is adapted to encode and decode light using finite length binary time sequences.

7. A confocal microscope as claimed in claim 6, wherein the extraction means comprises a time averaging device for averaging the detected light over the finite length of the sequences.

8. A confocal microscope as claimed in claim 7, wherein the at least one composite image mask is a spatial light modulator.

9. A confocal microscope as claimed in claim 6, wherein the at least one composite image mask is a spatial light modulator.

10. A confocal microscope as claimed in claim 1, wherein the at least one composite image mask is a spatial light modulator.

11. A confocal microscope as claimed in claim 10, wherein the spatial light modulator is a digital micromirror device.

12. A confocal microscope as claimed in claim 1, wherein the at least one composite image mask is an encoded rotatable disc.

13. A confocal microscope as claimed in claim 12, wherein the encoded rotatable disc includes substantially transparent regions enabling a conventional image to be extracted as well as the confocal image.

14. A confocal microscope as claimed in claim 1, wherein a single mask is provided and the microscope is arranged to operate in reflection mode.

15. A confocal microscope as claimed in claim 1, wherein at least two masks are provided and the microscope is arranged to operate in transmission mode.

16. A confocal microscope as claimed in claim 1, wherein the at least one composite image mask is encoded using intensity modulation.

17. A confocal microscope as claimed in claim 1, wherein the at least one composite image mask is encoded using polarization modulation.

18. A confocal microscope as claimed in claim 1, wherein the at least one composite image mask is encoded using phase modulation.

19. A confocal microscope as claimed in claim 1, wherein the means for detecting decoded light comprises a charge couple device camera.

20. A microscope attachment comprising at least one composite image mask for encoding light incident on a plurality of regions of a specimen and for simultaneously decoding light from the plurality of regions of the specimen whereby the decoded light produces a confocal image superimposed on a non-confocal image and means for directing light to and from the mask, the attachment being adapted for implementation in a conventional microscope.

* * * * *